(12) United States Patent
Endo

(10) Patent No.: US 11,424,935 B2
(45) Date of Patent: Aug. 23, 2022

(54) TAMPERING DETECTION SYSTEM AND METHOD FOR DETECTING TAMPERING

(71) Applicants: KABUSHIKI KAISHA TOSHIBA, Tokyo (JP); TOSHIBA DIGITAL SOLUTIONS CORPORATION, Kawasaki (JP)

(72) Inventor: Kotaro Endo, Tokyo (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 169 days.

(21) Appl. No.: 17/019,478

(22) Filed: Sep. 14, 2020

(65) Prior Publication Data
US 2020/0412549 A1 Dec. 31, 2020

Related U.S. Application Data

(63) Continuation of application No. PCT/JP2018/017331, filed on Apr. 27, 2018.

(51) Int. Cl.
*H04L 9/40* (2022.01)
*H04L 9/32* (2006.01)
(Continued)

(52) U.S. Cl.
CPC ........ *H04L 9/3247* (2013.01); *G06F 16/2379* (2019.01); *H04L 9/0637* (2013.01); *H04L 9/0643* (2013.01); *H04L 2209/38* (2013.01)

(58) Field of Classification Search
CPC ... H04L 9/3247; H04L 9/0637; H04L 9/0643; H04L 2209/38; G06F 16/2379
See application file for complete search history.

(56) References Cited

U.S. PATENT DOCUMENTS

2002/0138735 A1* 9/2002 Felt ..................... H04L 63/0428
713/176
2016/0259937 A1* 9/2016 Ford ....................... G06F 21/57
(Continued)

FOREIGN PATENT DOCUMENTS

JP 2017-207979 11/2017

OTHER PUBLICATIONS

International Search Report and Written Opinion for International Application Serial No. PCT/JP2018/017331 dated Aug. 7, 2018, 8 pages.

*Primary Examiner* — Ghodrat Jamshidi
(74) *Attorney, Agent, or Firm* — Amin, Turocy & Watson, LLP

(57) ABSTRACT

A tampering detection system according to an embodiment includes one or more first terminals connectable to any of one or more peers and one or more detectors. The first terminal includes an acquiring unit acquiring a block hash in a blockchain from the peer, and a transmitting unit transmitting a first transaction record that contains a first digitally signed message containing the block hash and data based on a transaction content of the first terminal and contains a digital signature for the first digitally signed message, to the peer. The detector includes a receiving unit receiving the blockchain from the peer and a detecting unit detecting blockchain tampering if the digital signature contained in the first transaction record in a block of the blockchain is invalid or if the blockchain contains no block hashes identical to the block hash contained in the first transaction record in the block.

11 Claims, 8 Drawing Sheets

(51) Int. Cl.
*G06F 16/23* (2019.01)
*H04L 9/06* (2006.01)

(56) References Cited

U.S. PATENT DOCUMENTS

| | | | |
|---|---|---|---|
| 2016/0300234 A1* | 10/2016 | Moss-Pultz | G06F 21/10 |
| 2017/0103390 A1* | 4/2017 | Wilson, Jr | G06Q 20/401 |
| 2017/0236120 A1* | 8/2017 | Herlihy | G06Q 20/065 |
| | | | 705/67 |
| 2017/0279818 A1* | 9/2017 | Milazzo | H04L 63/1433 |
| 2018/0294967 A1* | 10/2018 | Roberts | H04L 9/3297 |
| 2019/0034923 A1* | 1/2019 | Greco | G06Q 20/401 |
| 2019/0303621 A1* | 10/2019 | Baset | H04L 9/0637 |
| 2019/0318129 A1* | 10/2019 | David | H04L 67/104 |

* cited by examiner

FIG.5

```
1   for (block of ALL BLOCKS) {
2       var h1 = BLOCK HASH RECORDED IN block
3       var h2 = RECALCULATED BLOCK HASH
4       if (h1 IS DIFFERENT FROM h2) then DETECT TAMPERING
5   }
6   for (block of ALL BLOCKS) {
7       for (tx of ALL TRANSACTION RECORDS CONTAINED IN block) {
8           if (DIGITAL SIGNATURE OF tx IS INVALID) then DETECT TAMPERING
9           var h = BLOCK HASH CONTAINED IN tx
10          var i = BLOCK NUMBER CONTAINED IN tx
11          if (BLOCK HASH OF BLOCK NUMBER i IN THE
12                  BLOCK CHAIN IS INCONSISTENT WITH h) then DETECT TAMPERING
13      }
14  }
```

```
1   for (h1 of ALL RECORDED BLOCK HASHES) {
2       var h2 = RECALCULATE CORRESPONDING BLOCK HASH
3                   FROM STORED TRANSACTION RECORD
4       if (h1 IS DIFFERENT FROM h2) then DETECT TAMPERING
5   }
6   for (tx of ALL TRANSACTION RECORDS) {
7       if (DIGITAL SIGNATURE OF tx IS INVALID) then DETECT TAMPERING
8       var h = BLOCK HASH CONTAINED IN tx
9       if (h IS NOT STORED
10              IN MEMORY UNIT AS BLOCK HASH) then DETECT TAMPERING
11  }
```

TAMPERING DETECTION SYSTEM AND METHOD FOR DETECTING TAMPERING

CROSS-REFERENCE TO RELATED APPLICATIONS

This application is a Continuation of PCT International application No. PCT/JP2018/017331, filed on Apr. 27, 2018; the entire contents of which are incorporated herein by reference.

FIELD

Embodiments herein relate to a tampering detection system and a method for detecting tampering.

BACKGROUND

Cryptocurrencies represented by Bitcoin have been in practical use. Records of remittance of a cryptocurrency are stored in an electronic ledger called a blockchain. With regards to Bitcoin, a scheme called Proof of Work makes tampering of the blockchain difficult. Proof of Work is the foundation of the safety of Bitcoin. On the other hand, as applications for the blockchain, recording general dealing (transaction) to an electronic blockchain ledger which is not limited to money remittance has started. An electronic contract technology called smart contract is in practical use as an application of the blockchain. Furthermore, the blockchain is practically applied for a method of maintaining the consistency of a blockchain among a plurality of peers using a general consensus algorithm without using Proof of Work. This type of blockchain is called a permissioned blockchain.

Conventional techniques, however, have difficulty in detecting tampering of a blockchain. In particular, for the permissioned blockchain, detecting tampering of the blockchain is difficult if a peer administrator involves in conspiracy.

BRIEF DESCRIPTION OF DRAWINGS

FIG. 5 is a drawing of exemplary operation of a detecting unit of the embodiment.

DETAILED DESCRIPTION

A tampering detection system according to an embodiment includes one or more first terminals that are connectable to any of one or more peers; and one or more detectors. The first terminals each include a hardware processor configure to function as an acquiring unit, and a transmitting unit. The acquiring unit acquires a block hash contained in a blockchain from a peer. The transmitting unit transmits a first transaction record that contains a first digitally signed message containing the block hash and data based on a transaction content of the first terminal and contains a digital signature for the first digitally signed message, to the peer. The detectors each include a hardware processor configure to function as a receiving unit and a detecting unit. The receiving unit receives the blockchain from the peer. The detecting unit detects tampering of the blockchain when the digital signature contained in the first transaction record contained in a block of the blockchain is invalid or when the blockchain contains no block hash that is identical to the block hash contained in the first transaction record contained in the block. Embodiments of a tampering detection system and a method for detecting tampering will now be described in detail with reference to the accompanying drawings.

Example of Functional Configuration

Figure 1:
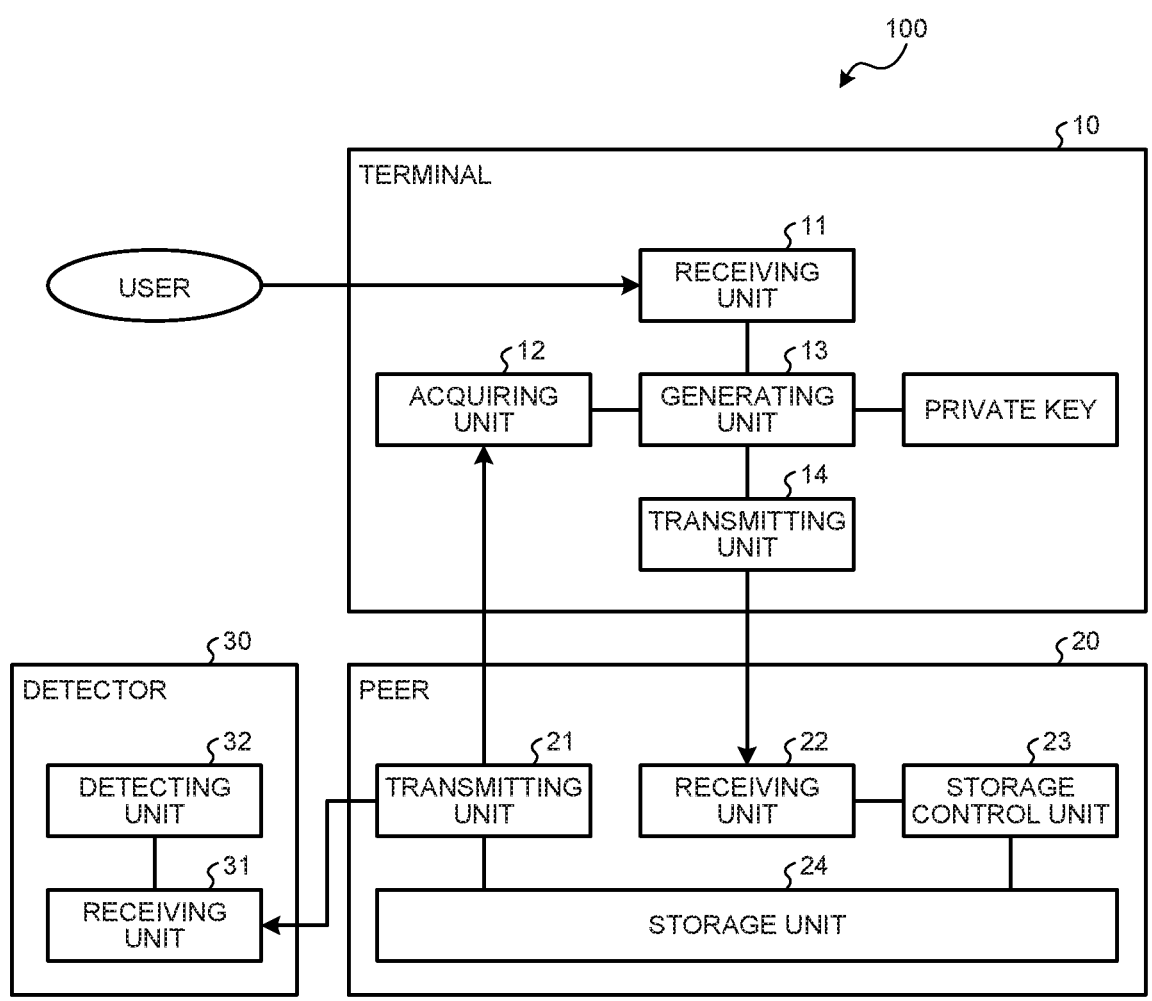
FIG. 1 is a diagram that illustrates an example functional configuration of a tampering detection system of an embodiment.

FIG. 1 is a diagram that illustrates an example functional configuration of a tampering detection system 100 of an embodiment. The tampering detection system 100 includes a terminal 10, a peer 20, and a detector 30. The terminal 10, the peer 20, and the detector 30 are connected to one another via a network such as the Internet.

Examples of the terminal 10 include a smart device and a personal computer used by a user. The peer 20 is a computer for storing therein blockchains. A blockchain is an electronic ledger containing one or more transaction records. The detector 30 is a device for detecting tampering of a blockchain stored in the peer 20.

A data structure of the blockchain stored in the peer 20 of the embodiment will now be described.

Figure 2:
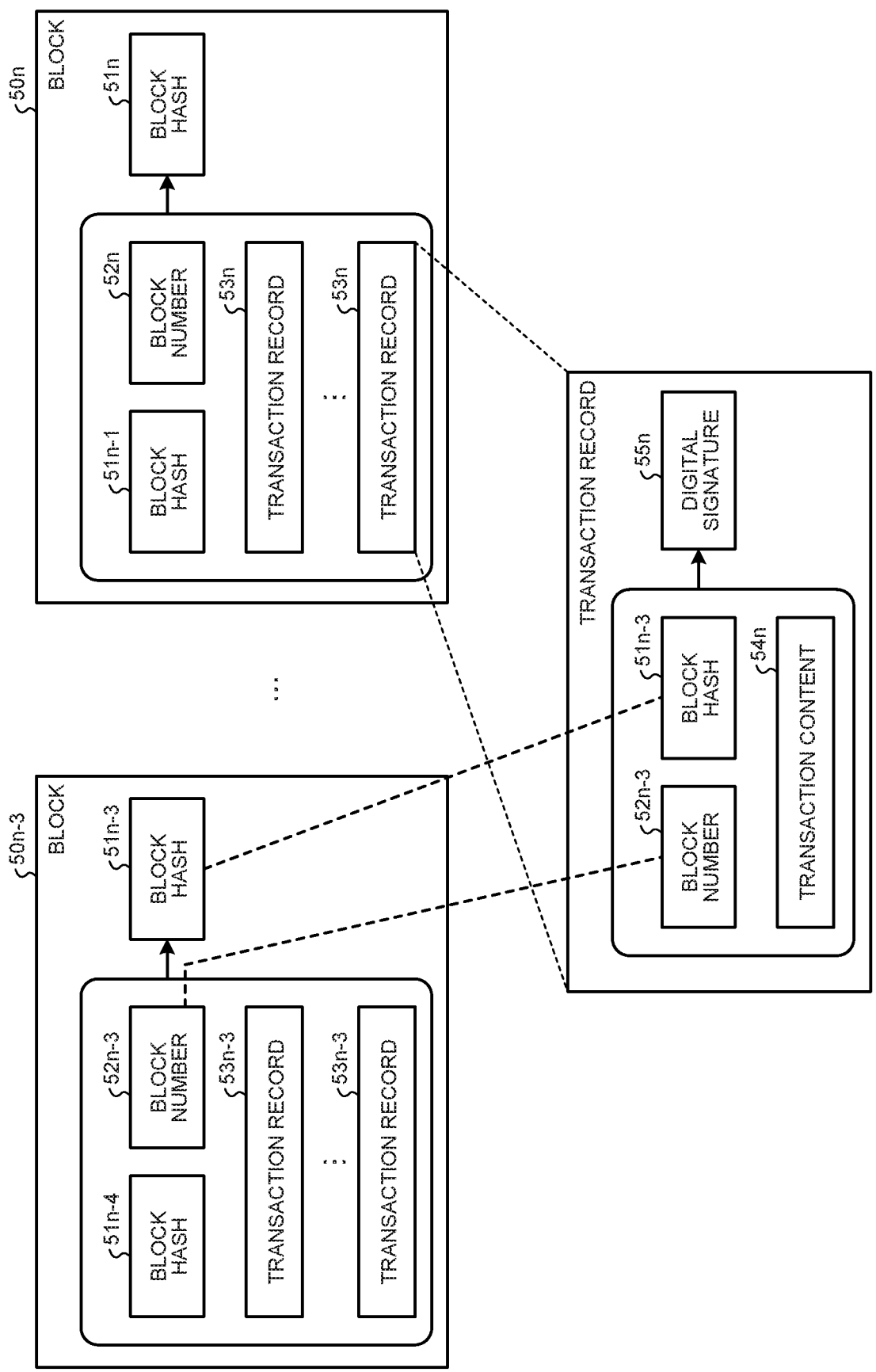
FIG. 2 is a diagram that illustrates an example data structure of a blockchain of the embodiment.

FIG. 2 is a diagram that illustrates an example data structure of a blockchain of the embodiment. As an example, the blockchain of the embodiment has a chain structure. The structure of the blockchain is not limited to a chain structure. Another example structure other than chain will be described later in a first modification of the embodiment.

In FIG. 2, the reference character n denotes data relating to the $n^{th}$ block. For example, a block $50n$ denotes the $n^{th}$ block, and a block $50n-3$ denotes the $n-3^{rd}$ block. A block hash $51n$ denotes a block hash of the $n^{th}$ block $50n$, a block hash $51n-1$ denotes a block hash of the $n-1^{st}$ block $50n-1$, a block hash $51n-3$ denotes a block hash of the $n-3^{rd}$ block $50n-3$, and a block hash $51n-4$ denotes a block hash of the $n-4^{th}$ block $50n-4$. If the n blocks are not distinguished from each other, n will be omitted in the description.

A blockchain of the embodiment is created with blocks 50, collectively containing a plurality of transaction records 53, added to the blockchain in time series. With respect to each of the blocks 50, a block number 52 is allocated in ascending order in time series. The block number 52 is used to identify the block 50 contained in the blockchain.

The block $50n$ includes a block hash $51n$, a block hash $51n-1$ of a previous block $50n-1$, zero or more transaction records $53n$, and a block number $52n$ of the block $50n$.

The block hash $51n$ is a hash value generated from a message consisting of a block hash $51n-1$ of the previous block $50n-1$, zero or more of the transaction records $53n$, and the block number $52n$ of the block $50n$. The hash value is calculated using a hash function (for example, SHA-256), which makes an inverse calculation for obtaining an input value from an output value (a hash value) difficult and has quite low probability of hash collisions. The block hash 51$n$ is generated when the block 50$n$ is generated.

Here, the transaction record 53$n$ contains a digitally signed message, which contains a block number 52$n$–3, a block hash 51$n$–3 and a transaction content 54$n$, and a digital signature 55$n$ of the digitally signed message. In other words, the $n^{th}$ transaction record 53$n$ contains a block hash 51$n$–k (k=3 in the example of FIG. 2) of a previous block 50$n$–k.

The block number 52$n$–3 is not mandatorily contained in the transaction record 53$n$. Containing the block number 52$n$–3 in the transaction record 53$n$ enables faster processing to identify the target block hash 51$n$–3 contained in the blockchain.

A block hash 51 contained in the block 50 is recursively calculated. As such, a set of transaction records 53, which are targets of calculation of the block hash 51, is considered to be all the transaction records 53 of the block 50 containing the transaction record 53 and therebefore. Thus, for example, if tampering involving deletion of the past transaction record 53 takes place, all the block hashes 51 of the block 50 containing the tampered transaction record 53 and thereafter are altered.

An example of tampering of a blockchain will now be described. Specifically, for example, after the target transaction record 53 is deleted, all the block hashes 51 containing the target transaction record 53 are recalculated, and then the blockchain is overwritten with the new block hashes 51 as valid block hashes. In the case of the Proof of Work scheme, it takes an enormous amount of time to recalculate all the block hashes 51, and thus this method of recalculation is actually not feasible. Even with the Proof of Work scheme, however, the theoretical information security is not satisfied. For example, in the case of using a cryptocurrency adopting the Proof of Work scheme, if the computing capability by a malicious user (or a group of malicious users) exceeds the computing capability by other good users, the conventional technologies have a possible difficulty in detecting tampering of a blockchain.

The tampering detection system 100 of the embodiment is a system enabling detection of tampering more easily when a blockchain, which is a proper blockchain at the time when stored in the peer 20, is tampered afterwards.

In the embodiment, although the block hash 51 can be theoretically recalculated from a set of all the transaction records 53, the block hash 51 is stored in the peer 20 in line with the transaction record 53 for each of the blocks 50 for the purpose of efficiency of the processing.

The block hash 51 may be calculated by any available method. Although a calculation method of the block hash 51 of the embodiment is assumed to have fewer constraints than the Proof of Work scheme has, the Proof of Work scheme is also usable.

Referring back to FIG. 1, operation of the terminal 10 will now be described in detail. Although the tampering detection system 100 in the example of FIG. 1 illustrates the single terminal 10, a plurality of the terminals 10 may be used. The number of the terminals 10 communicating with the peer 20 be optional.

The terminal 10 includes a receiving unit 11, an acquiring unit 12, a generating unit 13, and a transmitting unit 14. Referring to the flowchart of FIG. 3, operation of the receiving unit 11, the acquiring unit 12, the generating unit 13, and the transmitting unit 14 will be described in detail.

Exemplary Operation of Terminal

Figure 3:
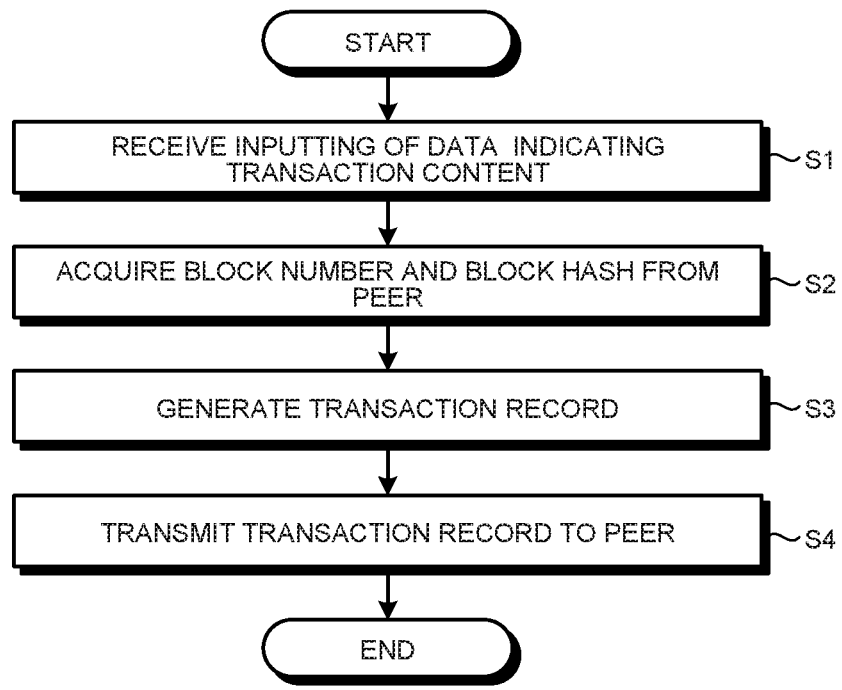
FIG. 3 is a flowchart of example operation of a terminal of the embodiment.

FIG. 3 is a flowchart of exemplary operation of the terminal 10 of the embodiment.

The receiving unit 11 receives inputting of data indicating a transaction content 54$n$ from the user (Step S1) and inputs the data to the generating unit 13. The transaction content 54$n$ may be any data. For example, the transaction content 54$n$ indicates remittance of a cryptocurrency.

The acquiring unit 12 acquires, from the peer 20, a block hash 51$n$–k contained in the blockchain and a block number 52$n$–k of a block 50$n$–k containing the block hash 51$n$–k (Step S2). In the example of FIG. 2, k equals to 3. It is preferable that k be smaller, but k need not be the latest (k=1).

Accordingly, the block hash 51$n$–k and the block number 52$n$–k can be acquired at any timing. For example, the acquiring unit 12 regularly (for example, every minute, every hour, or every day) acquires the block hash 51$n$–k and the block number 52$n$–k contained in the blockchain. Upon acquisition of a new block hash 51$n$–k2 and a new block number 52$n$–k2, the acquiring unit 12 discards the block hash 51$n$–k and the block number 52$n$–k acquired before the block hash 51$n$–k2 and the block number 52$n$–k2 are acquired.

For example, the acquiring unit 12 may acquire the block hash 51$n$–k and the block number 52$n$–k, upon receipt of a request of acquisition from the generating unit 13 when the generating unit 13 generates the transaction record 53.

For example, the acquiring unit 12 may passively acquire the block hash 51$n$–k and the block number 52$n$–k from the peer 20 using, as the trigger, the transmission of the block hash 51$n$–k and the block number 52$n$–k by the peer 20.

Any method can be used to select the block hash 51$n$–k to be acquired. For example, the acquiring unit 12 may acquire the newer block hash 51$n$–k out of the block hashes 51 contained in the blockchain on the basis of the block number 52. In the embodiment, the block hash 51$n$–k of a block 50$n$–k having a larger block number is the acquisition target.

For example, the acquiring unit 12 may acquire the newer block hash 51$n$–k out of the block hashes 51 contained in the blockchain on the basis of the time when the block hash 51 is generated.

For example, the acquiring unit 12 may acquire, from among the block hashes 51 contained in the blockchain and as a newer block hash 51$n$–k, a block hash 51 for which more transaction records 53 stored in the blockchain are used for the hash calculation.

The acquiring unit 12 inputs the acquired block hash 51$n$–k and the block number 52$n$–k to the generating unit 13.

The generating unit 13 receives data indicating the transaction content 54$n$ from the receiving unit 11 and receives the block hash 51$n$–k and the block number 52$n$–k from the acquiring unit 12. The generating unit 13 uses a private key of the terminal 10 to generate a digital signature 55$n$ of a message consisting of the block hash 51$n$–k and the block number 52$n$–k and the transaction content 54$n$. The generating unit 13 generates a transaction record 53$n$ (a first transaction record) containing the block hash 51$n$–k, the block number 52$n$–k, the transaction content 54$n$, and the digital signature 55$n$ (Step S3), and inputs the transaction record 53$n$ to the transmitting unit 14.

Next, the transmitting unit 14 receives the transaction record 53$n$ from the generating unit 13 and transmits the transaction record 53$n$ to the peer 20 (Step S4).

Referring back to FIG. 1, operation of the peer 20 will now be described in detail. In the example of FIG. 1, although the tampering detection system 100 includes the single peer 20, a plurality of the peers 20 may be used. For example, a plurality of peer administrators may operate one or more of the respective peers 20.

The peer 20 includes a transmitting unit 21, a receiving unit 22, a storage control unit 23, and a storage unit 24. Operation of the transmitting unit 21, the receiving unit 22, the storage control unit 23, and the storage unit 24 will now be described in detail with reference to the flowchart of FIG. 4.

Exemplary Operation of Peer

Figure 4:
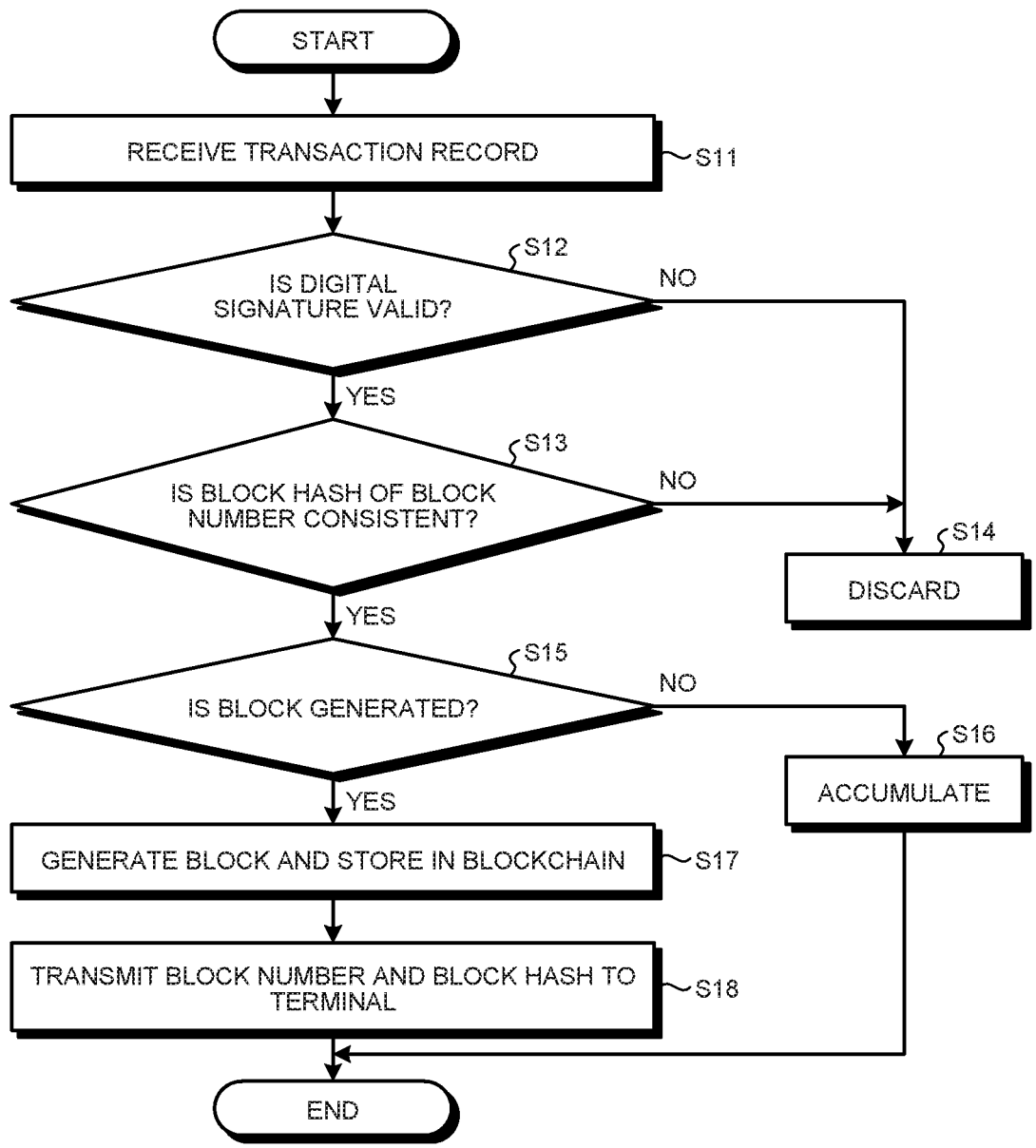
FIG. 4 is a flowchart of exemplary operation of a peer of the embodiment.

FIG. 4 is a flowchart of example operation of the peer 20 of the embodiment.

The receiving unit 22 receives the transaction record 53n from the terminal 10 (the transmitting unit 14) (Step S11) and inputs the transaction record 53n to the storage control unit 23.

The storage control unit 23 receives the transaction record 53n from the receiving unit 22 and determines whether the digital signature 55n contained in the transaction record 53n is valid (Step S12). If the digital signature 55n is invalid (No at Step S12), which means that the transaction record 53n has been tampered, the storage control unit 23 discards the transaction record 53n (Step S14).

If the digital signature is valid (Yes at Step S12), the storage control unit 23 identifies the block hash 51n–k stored in the blockchain using the block number 52n–k contained in the transaction record 53n and determines whether the identified block hash 51n–k is consistent with the block hash 51n–k contained in the transaction record 53n (Step S13). If the block hashes 51n–k are not consistent with each other (No at Step S13), the storage control unit 23 discards the transaction record 53n (Step S14). The processings of Step S12 and Step S13 guarantee that the transaction record 53n received at the processing of Step S11 is not tampered at the time when the transaction record 53n is stored in the peer 20.

If the block hashes 51n–k are consistent with each other (Yes at Step S13), the storage control unit 23 determines whether to generate a block 50n (Step S15). The number of the transaction records 53n contained in a block 50n is not limited to one. A plurality of the transaction records 53n may be contained. For example, when a pre-defined number of the transaction records 53n are accumulated, the storage control unit 23 will generate the block 50n containing the pre-defined number of the transaction records 53n.

If the block 50n is not to be generated (No at Step S15), the storage control unit 23 accumulates the transaction record 53n received at the processing of Step S11 in a buffer or the like of the storage control unit 23 (Step S16).

If the block 50n is to be generated (Yes at Step S15), the storage control unit 23 generates the block 50n that contains the transaction records 53n accumulated in the buffer or the like of the storage control unit 23 and the transaction record 53n received at the processing of Step S11 and stores the block 50n in a blockchain of the storage unit 24 (Step S17).

The transmitting unit 21 transmits the block number 52n of the block 50n generated at the processing of Step S17 and the block hash 51n contained in the block 50n to the terminal 10 (Step S18). The block hash 51n and the block number 52n transmitted at Step S18 are used in the transaction record 53 contained in a block for the $n+1^{st}$ block and thereafter. The processing of Step S18 may be omitted. For example, the processing of Step S18 is omitted, if the acquiring unit 12 of the terminal 10 autonomously acquires a block hash 51n+1–k and a block number 52n+1–k in generating the transaction record 53 contained in a block for the $n+1^{st}$ block and thereafter.

Referring back to FIG. 1, operation of the detector 30 will be described in detail. In the example of FIG. 1, the tampering detection system 100 includes the single detector 30. Instead of this, a plurality of the detectors 30 may be included.

The detector 30 includes a receiving unit 31 and a detecting unit 32. In the example of FIG. 1, the detector 30 is installed outside the peer 20. This configuration allows an auditor independent from the administrator of the peer 20 to detect tampering of the blockchain stored in the peer 20.

The receiving unit 31 receives the blockchain from the peer 20 (the transmitting unit 21) and inputs the blockchain to the detecting unit 32.

The detecting unit 32 detects whether the blockchain has been tampered by confirming each block 50 in the blockchain.

FIG. 5 is a drawing of exemplary operation of the detecting unit 32 of the embodiment. The reference character tx in FIG. 5 indicates the transaction record 53 (transaction).

The detecting unit 32 recalculates the block hash 51 contained in each of the blocks 50 and determines whether the hash value obtained by the recalculation is consistent with the block hash 51 contained in the block 50 (the first to the fifth lines in FIG. 5). If the hash value obtained by the recalculation is inconsistent with the block hash 51 contained in the block 50, the detecting unit 32 detects tampering of the blockchain.

The detecting unit 32 determines the validity of a digital signature 55 contained in the transaction record 53 contained in each block 50 of the blockchain (the eighth line of FIG. 5). If the digital signature 55 contained in the transaction record 53 contained in the block 50 of the blockchain is invalid, the detecting unit 32 detects tampering of the blockchain.

If the blockchain contains no block hashes 51 identical to the block hash 51 contained in the transaction record 53 contained in the block 50, the detecting unit 32 detects tampering of the blockchain. Specifically, the detecting unit 32 determines whether the block hash 51 of the block 50, identified from the blockchain using the block number 52 contained in the transaction record 53, is consistent with the block hash 51 contained in the transaction record (the ninth to the twelfth lines in FIG. 5). If the block hash 51 of the identified block 50 is inconsistent with the block hash 51 contained in the transaction record, the detecting unit 32 detects tampering of the blockchain.

The order of the processing steps for detecting tampering illustrated in FIG. 5 is an example, and the processing steps for detecting tampering may be performed in any desired order.

Advantageous Effect of Embodiment

As described above, the tampering detection system 100 of the embodiment includes one or more of the terminals 10 (first terminals) connectable to any of one or more of the peers 20, and the detector 30. In the terminal 10 or the terminals 10, the acquiring unit 12 acquires the block hash 51 contained in the blockchain from the peer 20. The transmitting unit 14 transmits to the peer 20 the transaction record 53 (a first transaction record) which contains a digitally signed message (first digitally signed message) containing the block hash 51 and data based on the transaction content 54 of the terminal 10 (in this embodiment, the transaction content 54 per se) and contains the digital signature 55 for the digitally signed message. The receiving unit 31 of the detector 30 receives the blockchain from the peer 20. The detecting unit 32 detects tampering of the blockchain if the digital signature 55 contained in the transaction record 53 in the block 50 of the blockchain is invalid, or if the blockchain contains no block hashes 51 identical to the block hash 51 contained in the transaction record 53 in the block 50.

This enables the tampering detection system 100 of the embodiment to more easily detect tampering of the blockchain. In particular, if a peer administrator of the permissioned blockchain involves in conspiracy, tampering of the blockchain is detectable more easily.

More specifically, because conventional tampering such as addition, deletion, and order replacement of a transaction record does not alter the transaction record per se, conventional verifications of the digital signatures of the transaction records cannot detect tampering. Moreover, if the administrators of all the peers involve in conspiracy to tamper the transaction record by, for example, adding, deleting, and replacing the orders of the record, the content of the blockchain is consistent between the peers. It is therefore difficult to detect tampering of the blockchain by making comparison between the peers.

The block hash 51 uniquely determines the composition of the transaction record 53 on which the block hash 51 is calculated, at the probability that is considered to be almost 100%. In other words, if tampering such as adding, deleting, and changing the orders in the transaction record 53 occurs, the block hash 51 contained in the transaction record 53 of the embodiment is inconsistent with the block hash 51 contained in the blockchain at the probability that is considered almost 100%.

Since good users have no reasons to help the tampering, the transaction records 53 of such good users are expected not to be tampered as long as their digital signatures 55 are confirmed to be valid (because tampering requires that the good users give the digital signatures to the tampered data and thereafter).

The block hash 51 contained in the transaction record 53 is therefore expected not to be tampered, and accordingly, the transaction record 53 used for the calculation is expected not to be tampered (because inverse calculation of the hash function is difficult and it is expectable that the probability of accidental occurrence of an collision is almost 0%).

When the blockchain detected not to be tampered by the detecting unit 32 of the embodiment contains more transaction records 53 of good users, it is expectable that the blockchain is not tampered regardless of the credibility of the peer administrators.

Conversely, for the peer administrators to tamper the blockchain, they need to delete all the transaction records 53 containing the block hash 51 calculated from the tampering target transaction record 53 or need to request the users to redo digital signatures using the tampered block hash 51 (the later means asking the users for cooperation to the tampering). As transaction records 53 of good users increase, the number of transaction records 53 to be deleted increases, and the impact by the tampering becomes larger. The possibility of finding out the tampering from the different aspect is high.

As described above, according to the embodiment, the more good users using the blockchain, the higher possibility of verification that the blockchain has not been tampered regardless of the credibility of the peer administrators. A typical example of the good user is an auditor who attempts to verify the data. Even in the case where the good users cannot be identified, if there are more users unrelated to the interest, it is possible to reasonably presume that a great number of good users are involved. The advantageous effects of the embodiment are therefore expectable.

First Modification of Embodiment

A first modification of the embodiment will now be described. In the first modification, the same description as the above embodiment will be omitted, and the differences therebetween will be described.

In the first modification, the structure of a blockchain is generalized. For example, unless the system uses the Proof of Work scheme, a blockchain is not necessarily formed in chains, and the block number 52 is not necessary. The essence is that the block hash is calculable from the transaction record 53 contained in the blockchain and therebefore. How to calculate the block hash and how to select the transaction record 53 used for the calculation are flexible.

In the first modification, a hash value (a block hash 51) is calculated from the previous transaction record 53 using a tree structure called a hash tree (Merkle Tree).

Figure 6:
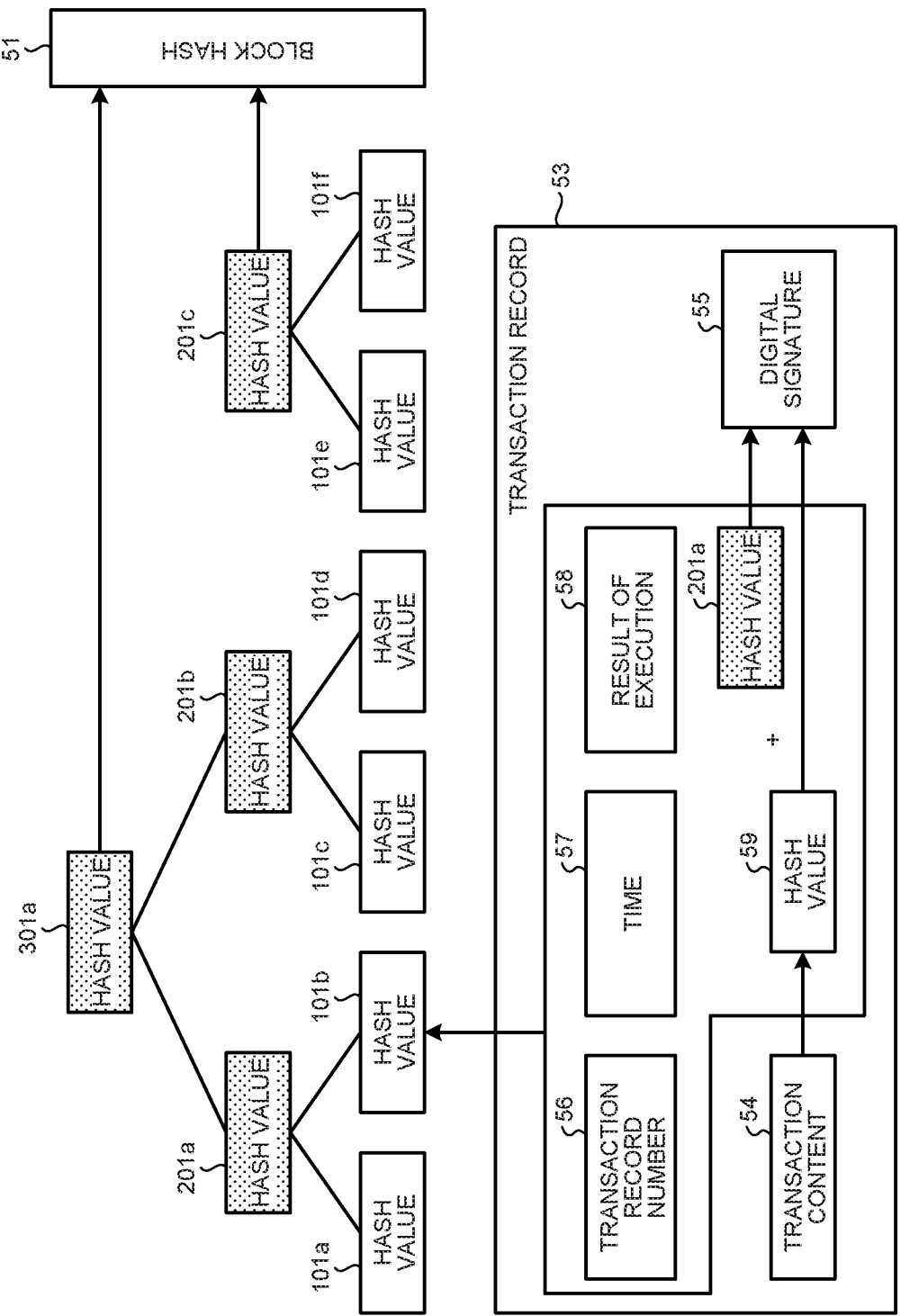
FIG. 6 is a diagram that illustrates example calculations of a block hash of a first modification of the embodiment.

FIG. 6 is a diagram that illustrates example calculations of the block hash 51 of the first modification of the embodiment. In the example of FIG. 6, the calculations use a hash tree containing hash values 101*a* to 101*f*, 201*a* to 201*c*, and 301*a*. For example, when generating a new block 50, the storage control unit 23 calculates the block hash 51 using the hash values 201*c* and 301*a*, as the block hash 51 based on the previous transaction record 53. The obtained block hash 51 is added to the hash tree, whereby the hash tree is updated. For verification of the blockchain, the detecting unit 32 searches the hash tree for a hash value (the block hash 51) contained in the transaction record 53 of each block 50 and determines whether the hash value is contained in the hash tree.

Bitcoin uses a hash tree for hash calculations inside a block. The blocks are connected to one another in chains. In the first modification, a hash tree is used for connection between the blocks. For example, use of the hash tree structure for connection between the blocks can reduce the time to determine whether a certain transaction record 53 (a certain block hash 51) is contained in the blockchain.

In the example of FIG. 6, the transaction record 53 contains the transaction content 54, the digital signature 55, a transaction record number 56, a time 57, a result of execution 58, a hash value 59, and the hash value 201*a*. The digitally signed message, to which the digital signature 55 is given, is the hash value 59 and the hash value 201*a*.

The hash value 101*b* to be added to the hash tree is calculated from the transaction record number 56, the time 57, the result of execution 58, the hash value 59, and the hash value 201*a*.

The transaction record number 56 is a number for identifying the transaction content 54. The time 57 is a time when the transaction of the transaction content 54 is conducted. The result of execution 58 is a result of processing such as smart contract. The hash value 59 is calculated from the transaction content 54. Calculation of the hash value 101*b* (the block hash 51) uses the hash value 59, calculated based on the transaction content 54, instead of using the transaction content 54. This method enables verification (detection of tampering) of the blockchain without having the transaction content 54 disclosed.

Figure 7:
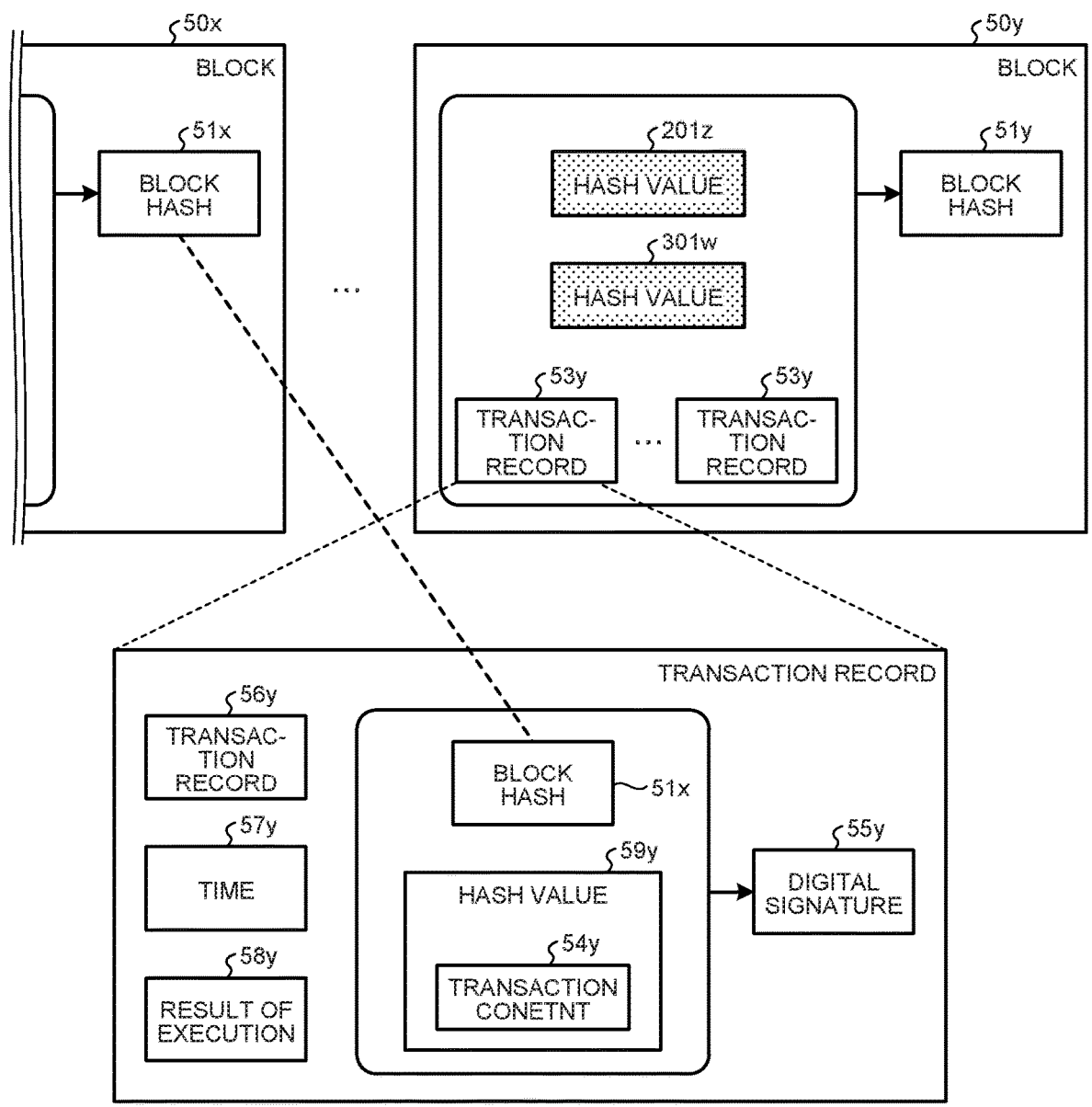
FIG. 7 is a diagram that illustrates an example data structure of a blockchain of the first modification of the embodiment.

FIG. 7 is a diagram that illustrates an example data structure of a blockchain of the first modification of the embodiment. In the first modification, a blockchain has a tree structure (see FIG. 6).

In FIG. 7, the reference characters x and y indicate data relating to a certain block contained in the hash tree. In the following description, x and y will be omitted if the blocks are not necessarily to be distinguished.

The blockchain of the first modification is created with the blocks 50 in which a plurality of transaction records 53 are accumulated added to the hash tree.

A block 50y contains a block hash 51y, a hash value 201z, a hash value 301w, and one or more transaction records 53y. The hash values 201z and 301w are hash values (the block hash 51 calculated based on a past transaction record 53) contained in the hash tree.

The block hash 51y is a hash value calculated based on the hash value 201z and the hash value 301w and one or more transaction records 53y. The block hash 51y is generated when the block 50y is generated.

The transaction record 53y contains a block hash 51x, a digital signature 55y, a transaction record number 56y, a time 57y, a result of execution 58y, and a hash value 59y. The hash value 59y is a hash value calculated from the transaction content 54y.

The block hash 51x is a block hash contained in a block 50x of the blocks 50 stored in the tree structure. The digitally signed message, to which the digital signature 55y is given, consists of the block hash 51x and the hash value 59y.

Figures 8, 9:
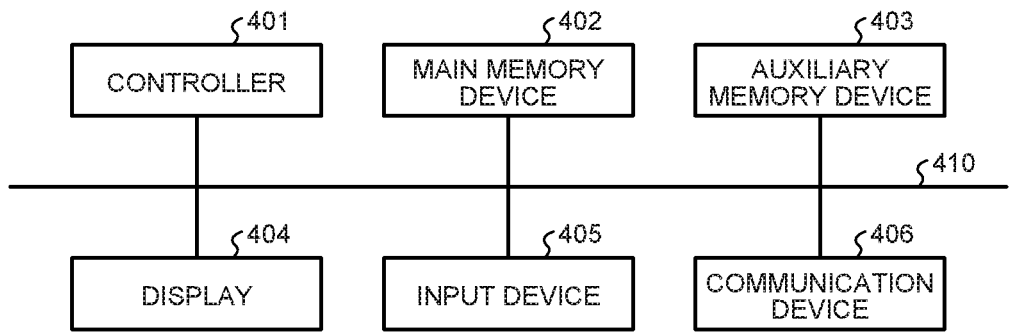
FIG. 8 is a drawing of exemplary operation of a detecting unit of the first modification of the embodiment.
FIG. 9 is a drawing that illustrates a hardware configuration of the terminal, the peer, and a detector of the embodiment.

FIG. 8 is a drawing of example operation of the detecting unit 32 of the first modification of the embodiment. The reference character tx in FIG. 8 indicates the transaction record 53 (transaction).

The detecting unit 32 recalculates the block hash 51 stored in the hash tree and determines whether the hash value obtained by the recalculation is consistent with the block hash 51 stored in the hash tree (the first to the fifth lines in FIG. 8). If the hash value obtained by the recalculation is inconsistent with the block hash 51 stored in the hash tree, the detecting unit 32 detects tampering of the blockchain.

The detecting unit 32 determines the validity of the digital signature 55 contained in the transaction record 53 of the block 50 connected to the tree structure (the seventh line of FIG. 5). If the digital signature 55 contained in the transaction record 53 is invalid, the detecting unit 32 detects tampering of the blockchain.

If the blockchain contains no block hashes 51 identical to the block hash 51 contained in the transaction record 53 in the block 50, the detecting unit 32 detects tampering of the blockchain (the eighth to the tenth lines in FIG. 5).

As described above, according to the first modification of the embodiment, the tree structure of a blockchain is further effective in easily detecting tampering of the blockchain. Use of the hash value 59, calculated based on the transaction content 54, instead of using the transaction content 54 enables verification of the blockchain without having the transaction content 54 disclosed.

Second Modification of Embodiment

A second modification of the embodiment will now be described. In the second modification, the same description as the above embodiment will be omitted, and the differences therebetween will now be described.

The second embodiment relates to an operation performed by a combination of the terminal 10 (the first terminal) of the embodiment and another terminal (a second terminal) that generates a transaction record containing neither the block hash 51 nor the block number 52. Specifically, the second embodiment relates to an operation performed, for example, during a system migration period, in which the terminal that generates a transaction record containing neither the block hash 51 nor the block number 52 migrates to the terminal 10 (the first terminal) of the embodiment.

The first terminal transmits the above first transaction record (the transaction record 53n containing the block hash 51n-k, the block number 52n-k, the transaction content 54n, and the digital signature 55n) to the peer 20.

The second terminal transmits a transaction record (a second transaction record) that contains a digitally signed message (the second digitally signed message) containing a transaction content of the second terminal and contains a digital signature given to the digitally signed message, to the peer 20.

The storage control unit 23 of the peer 20 stores a block containing at least one of the first transaction record and the second transaction record in the blockchain. The storage control unit 23 performs the processing of above Step S13 on the first transaction record and does not perform the processing of Step S13 on the second transaction record.

The structure of the second modification maintains the same advantageous effects as the embodiment, if good users input the first transaction records with predetermined or higher frequency. The above good users mean users giving digital signatures to the transaction records. They are independent from the peer administrator and do not profit from the tampering of the blockchain.

Third Modification of Embodiment

A third modification of the embodiment will now be described. In the third modification, the same description as the above embodiment will be omitted, and the differences therebetween will be described.

In the third modification, a specific user, as a good user, regularly stores the transaction record 53 in the blockchain through the terminal 10. The specific user herein described is, for example, an organization who is independent as a third party and is trustworthy in the society. The terminal 10 used by the specific user records, as the transaction content 54, "the regular access of a third person". The purpose is not to record transactions but to regularly store the transaction records 53 in the blockchain. The transaction record 53 contains the block hash 51, and because the specific user is credible, the transaction record 53 based on which the block hash 51 is calculated can be verified not to have been tampered.

The detecting unit 32 can detect that the transaction record 53 has been tampered, if the transaction record 53 of the specific user is not regularly stored in the blockchain. For example, if a malicious user tampers the transaction record 53 by deleting the record, and a part or all of the transaction records 53, which is supposed to be regularly stored in the blockchain, is not contained in the blockchain, the blockchain is found out to have been tampered.

The tampering detection system 100 may be operated in the form of the above second modification, by permitting the specific user to exclusively use the terminal 10 of the embodiment. In this case, detecting tampering of the blockchain entirely depends on the credibility of the specific user.

An example hardware configuration of the terminal 10, the peer 20, and the detector 30 of the embodiment will now be described.

Example Hardware Configuration

FIG. 9 is a drawing that illustrates a hardware configuration of the terminal 10, the peer 20, and the detector 30 of the embodiment. Each of the terminal 10, the peer 20, and the detector 30 includes a controller 401, a main memory device 402, an auxiliary memory device 403, a display 404, an input device 405, and a communication device 406. The controller 401, the main memory device 402, the auxiliary memory device 403, the display 404, the input device 405, and the communication device 406 are connected to one another via a bus 410.

The controller 401 executes a computer program loaded onto the main memory device 402 from the auxiliary memory device 403. The main memory device 402 is a memory such as a read only memory (ROM) and a random access memory (RAM). The auxiliary memory device 403 is, for example, a hard disk drive (HDD) and a memory card.

The display 404 displays information. Examples of the display 404 include a liquid crystal display. The input device 405 is an interface to receive an input. Examples of the input device 405 include a keyboard and a mouse. The display device 404 and the input device 405 may be, for example, a touch screen having a display function and an input function. The communication device 406 is an interface used for communication with other devices.

A computer program executed by the terminal 10, the peer 20, and the detector 30 of the embodiment is stored in a computer-readable memory medium such as a CD-ROM, a memory card, a CD-R, and a DVD in an installable or an executable file, and is provided as a computer program product.

The computer program executed by the terminal 10, the peer 20, and the detector 30 of the embodiment may be stored in a computer connected to a network such as the Internet and provided by being downloaded via the network. The computer program executed by the terminal 10, the peer 20, and the detector 30 of the embodiment may be provided via a network such as the Internet without being downloaded.

The computer program executed by the terminal 10, the peer 20, and the detector 30 of the embodiment may be previously embedded in a ROM or the like and provided.

The computer program executed by the terminal 10, the peer 20, and the detector 30 of the embodiment is configured as a module that includes functional blocks implementable by the computer program, of the above functional blocks illustrated in FIG. 1. As actual hardware, the functional blocks are loaded onto the main memory device 402 with the controller 401 reading the computer program from a memory medium and executing the program. The functional blocks are generated on the main memory device 402.

Some or all of the above functional blocks in FIG. 1 may be implemented as hardware such as an integrated circuit (IC) instead of being implemented as software.

In the use of a plurality of processors to implement the functions, each processor may implement one function or two or more functions.

Any desired operation mode of the terminal 10, the peer 20, and the detector 30 of the embodiment is applicable. The terminal 10, the peer 20, and the detector 30 of the embodiment may operate as devices on the cloud platform of a network.

While some embodiments of the present invention have been described above, it should be noted that these embodiments are only examples and are not intended to limit the scope of the invention. These novel embodiments can be implemented in various other forms, and various omissions, replacements, and changes can be made without departing from the gist of the invention. These embodiments and their modifications are included in the scope and the gist of the present invention, and included in the range of equivalents of the invention disclosed in the appended claims.

For example, modifications that could be easily conceived of by the skilled person are included in the scope and the gist of the present invention, and included in the range of equivalents of the invention disclosed in the appended claims. More specifically, the data structure used for the above calculations of hash values is not limited to a chain structure or a tree structure. The method of calculating hash values can be modified in various fashions such as calculations in topology, a combination of the calculations, and recursive use of the results of the calculations.

What is claimed is:

1. A tampering detection system comprising:
   one or more first terminals that are connected to any of one or more peers; and
   one or more detectors, wherein
   the first terminals each comprise:
   a hardware processor configured to function as:
     an acquiring unit that acquires a block hash contained in a blockchain from one of the one or more peers, and
     a transmitting unit that transmits a first transaction record that contains a first digitally signed message containing the block hash and data based on a transaction content of a first terminal and contains a digital signature for the first digitally signed message, to the one of the one or more peers, and
   the detectors each comprise:
   a second hardware processor configured to function as:
     a receiving unit that receives the blockchain from the peer, and
     a detecting unit that detects tampering of the blockchain when the digital signature contained in the first transaction record contained in a block of the blockchain is invalid or when the blockchain contains no block hash that is identical to the block hash contained in the first transaction record contained in the block.

2. The tampering detection system according to claim 1, wherein the data based on the transaction content of the first terminal is either the transaction content of the first terminal or a hash value of the transaction content of the first terminal.

3. The tampering detection system according to claim 1, wherein
   the first digitally signed message further contains a block number of a block corresponding to the block hash, and
   the detecting unit stores the block containing the first transaction record in the blockchain, when the digital signature contained in the first transaction record is valid, and when a block hash of a block identified from the blockchain using the block number contained in the first transaction record is consistent with the block hash contained in the first transaction record.

4. The tampering detection system according to claim 3, wherein the acquiring unit acquires a newer block hash out of block hashes contained in the blockchain on the basis of the block number.

5. The tampering detection system according to claim 1, wherein the acquiring unit acquires a newer block hash out of block hashes contained in the blockchain, on the basis of a time when the block hash is generated.

6. The tampering detection system according to claim 1, wherein the acquiring unit acquires, from among block hashes contained in the blockchain and as a newer block, a block hash for which more first transaction records stored in the blockchain are used for a hash calculation.

7. The tampering detection system according to claim 1, wherein the acquiring unit acquires a block hash contained in the blockchain, and upon acquisition of a new block hash, discards a block hash acquired before the new block hash is acquired.

8. The tampering detection system according to claim 1, further comprising the one or more peers, wherein
   the peers each include a storage control unit that stores a block containing the first transaction record in the blockchain when the digital signature contained in the first transaction record is valid, and when the blockchain contains a block hash that is identical to the block hash contained in the first transaction record.

9. The tampering detection system according to claim 8, further comprising one or more second terminals, wherein
   a second terminal transmits a second transaction record that contains second digitally signed message containing a transaction content of the second terminal and contains a digital signature for the second digitally signed message, to one of the one or more peers, and
   the storage control unit stores a block containing at least one of the first transaction record and the second transaction record in the blockchain.

10. The tampering detection system according to claim 1, wherein
    the one or more first terminals include a first terminal to which a specific user transmits the first transaction record, and
    the detecting unit further determines whether the first transaction record transmitted from the specific user is contained in the blockchain and detects tampering of the blockchain when a part or all of first transaction records transmitted from the specific user is not contained in the blockchain.

11. A method for detecting tampering of a tampering detection system that includes one or more first terminals connected to any of one or more peers and one or more detectors, the method comprising:
    acquiring, by a hardware processor of a first terminal, a block hash contained in a blockchain from one of the one or more peers;
    transmitting, by the hardware processor of the first terminal, a first transaction record that contains first digitally signed message containing the block hash and data based on a transaction content of the first terminal and contains a digital signature for the first digitally signed message, to the one of the one or more peers;
    receiving, by a hardware processor of a detector, the blockchain from the peer; and
    detecting, by the hardware processor of the detector, tampering of the blockchain when the digital signature contained in the first transaction record contained in a block of the blockchain is invalid or when the blockchain contains no block hash that is identical to the block hash contained in the first transaction record contained in the block.

* * * * *